(12) United States Patent
Petäjä-Suvanto

(10) Patent No.: US 6,860,057 B1
(45) Date of Patent: Mar. 1, 2005

(54) SWIMMING DEVICE

(75) Inventor: Tuomo Petäjä-Suvanto, Veteli (FI)

(73) Assignee: Kaustmark Oy, Kaustinen (FI)

( * ) Notice: Subject to any disclaimer, the term of this patent is extended or adjusted under 35 U.S.C. 154(b) by 0 days.

(21) Appl. No.: 10/088,116

(22) PCT Filed: Sep. 15, 2000

(86) PCT No.: PCT/FI00/00781
§ 371 (c)(1),
(2), (4) Date: Jun. 20, 2002

(87) PCT Pub. No.: WO01/20978
PCT Pub. Date: Mar. 29, 2001

(30) Foreign Application Priority Data

Sep. 17, 1999 (FI) .............................. 990396 U

(51) Int. Cl.[7] .......................... A01K 97/00; B63B 9/00; G01N 17/00

(52) U.S. Cl. ............................... 43/4; 73/148; 73/865.6

(58) Field of Search ............................ 43/1, 4; 73/148, 73/865.3, 865.6, 432.1; 119/250, 248, 225

(56) References Cited

U.S. PATENT DOCUMENTS

| 1,630,797 | A | * | 5/1927 | Marwick ......................... 4/509 |
| 1,731,554 | A | * | 10/1929 | Wheeler ........................ 472/82 |
| 1,992,891 | A | * | 2/1935 | Schmidt ........................ 452/80 |
| 2,382,999 | A | * | 8/1945 | Lee ............................. 73/148 |
| 3,028,688 | A | * | 4/1962 | Ebert .......................... 434/392 |
| 3,240,056 | A | * | 3/1966 | Read ........................... 73/117.1 |
| 3,333,465 | A | * | 8/1967 | Goodman ..................... 73/148 |
| 3,473,360 | A | * | 10/1969 | Carey .......................... 73/148 |
| 3,513,696 | A | * | 5/1970 | Blair ........................... 73/148 |
| 3,543,573 | A | * | 12/1970 | Hunziker .................... 73/117.1 |
| 3,905,234 | A | * | 9/1975 | Berghof ...................... 73/865.6 |
| 4,349,978 | A |   | 9/1982 | Philip |
| 4,798,085 | A | * | 1/1989 | Malakhoff et al. ............ 73/148 |
| 5,265,368 | A |   | 11/1993 | Taylor |

FOREIGN PATENT DOCUMENTS

| FI | 4311 | 1/2000 |
| WO | WO 00/51203 | 8/2000 |

* cited by examiner

Primary Examiner—Kurt Rowan
(74) Attorney, Agent, or Firm—Young & Thompson

(57) ABSTRACT

The present invention relates to a swimming device for testing a lure (12) used in rod-fishing. This type of a device comprises two substantially parallel pipe-like means (1, 2) and arranged in a substantially horizontal position. The pipe-like means are preferably connected to each other by connection means (3, 4) arranged at both ends of the pipes, and there are stilling basins (9, 10) immediately next to the connection means. Further, a control means (6) maintaining the flow of the fluid (5) led in to the swimming device is arranged into one of the pipe-like means. In the operating position of the device, the upper pipe-like means, i.e. testing pipe, has a lure tower (13) connected to the pipe and protruding from it, and the lure (12) can be lowered into the swimming device for testing it in the fluid flow caused in the testing pipe.

14 Claims, 2 Drawing Sheets

SWIMMING DEVICE

FIELD OF THE INVENTION

The present invention relates to a swimming device for testing a lure used in rod-fishing and angling.

BACKGROUND OF THE INVENTION

Making one's own lures has long been a special sector in lure-fishing and angling. A great deal of literature exists on the matter and various lure-making models and methods have been widely presented.

In general, lures are made at home and during winter in particular when less fishing is done especially in the northern hemisphere. One special problem in lure-making is then testing the finished lure or one being made. Testing requires a water pool in which the lure can be trolled and its behaviour thus observed in its environment of use. During open waters, a near-by water system can naturally be used as the water pool. Alternatively, the lure can be tested at home in the bath tub if available.

Using water systems or tubs or the like is, however, difficult because it is difficult to accurately observe the movements of the lure. When testing the results of lure-making in tubs or pools, the achieved swimming movement of the lure is usually too short for it to allow any accurate conclusions on the functioning of the lure in actual fishing conditions.

BRIEF DESCRIPTION OF THE INVENTION

It is thus an object of the present invention to eliminate the current drawbacks in lure-testing and to provide a novel solution which simply, advantageously and quickly illustrates the functioning of a finished lure or one being made in different flow conditions.

This object is achieved by a swimming device having the characteristics of the present invention.

In the present invention, a lure refers to spinners, spoons, plugs and jigs used in lure-fishing and to different flies used in fly-fishing.

The invention provides considerable advantages. It provides a device for testing a lure in the immediate vicinity of the place where it is made, whereby making lures becomes considerably simpler than before. This way, a lure being made can be tested immediately after it is finished, and testing different structural solutions is also very easy while the work progresses. The device is easy to use, since it is small, structurally simple and reliable. By means of the invention, it is also easy to test different lures in different flow conditions and when necessary, special devices can be constructed to best suit the testing of flies, spinners, plugs or the like.

It is easy to observe the swimming movement of the lure in the swimming device of the invention, because the testing pipe is preferably made entirely transparent by manufacturing it from plexiglass, for instance. The swimming movement can also be observed in different flow conditions by changing the flow rate of the water simply by adjusting the power of a control device in a lower pipe-like means.

The swimming device of the invention does not require much space, since it can be placed in any kind of work room. Because the device is fully water-proof, it also does not require any special water-proofing properties of its operating environment.

BRIEF DESCRIPTION OF THE FIGURES

In the following, the invention will be examined in greater detail by means of the appended drawings, in which.

DETAILED DESCRIPTION OF THE INVENTION

Figure 1:
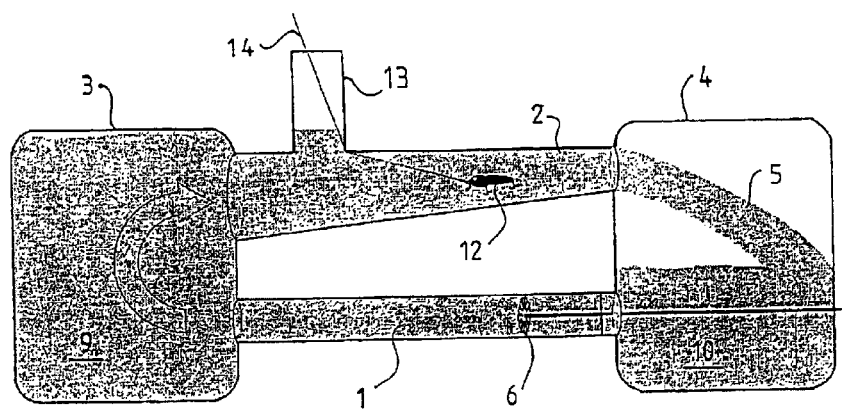
FIG. 1 shows a schematic side view of a preferred embodiment of the swimming device of the invention, especially intended for testing large lures.

The structure and operation of the swimming device of the invention can be quickly described with reference to FIG. 1. The device comprises two pipe-like means which are preferably arranged on top of each other and in which water runs, i.e. in operating position, the device shows a lower flow pipe 1 and an upper testing pipe 2. These pipe-like means are usually arranged in a substantially horizontal position and they are, in the vertical direction, connected to each other by connection means 3 and 4 which enable the circulation of a fluid 5—preferably water let into the device—in both means. The fluid let into the swimming device is circulated by a control means 6 arranged in the flow pipe, which control means preferably is a conventional propeller run by an electric motor 7. However, nothing prevents the use of another kind of arrangement known per se, such as a water turbine, for controlling the fluid.

Figure 4:
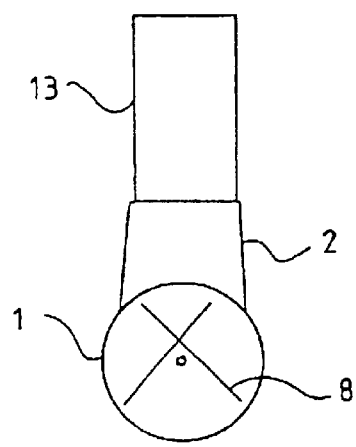
FIG. 4 shows the cross-profile of the swimming device of FIG. 2.

To stabilise the flow of the fluid 5, at least the flow pipe 1 of the device can be fitted with control lamellas 8 in the longitudinal direction of the pipe as shown in FIG. 4. On the other hand, stilling basins 9 and 10 are arranged at each end of the device to control the swirling of the fluid and the fluid in the device is led through the basins as it flows between the flow pipe and the testing pipe 2. The stilling basins can also be equipped with control lamellas 11 or the like to reduce the swirling of the fluid.

The upper pipe-like means, i.e. testing pipe 2, is arranged to be at least partly transparent by manufacturing it of plexiglass or acrylic resin, for instance, whereby the lure 12 lowered into the pipe and its behaviour in the flow of the testing pipe can be seen from all essential directions. The testing pipe has reception means 13, i.e. a lure tower, for lowering the lure into the testing tube, and the reception means are arranged to open at their testing-pipe-end into the testing pipe, their other end being arranged to receive the lure placed into the lure tower.

The device functions by filling it with fluid 5, usually clean water, as shown in FIG. 1. The device is filled up to the reception means 13 to create pressure in the testing pipe 2. When the device is filled with water, the required water flow is achieved by the control means 6 by starting the motor 7. Forced by the control means, water flows to the stilling basin 9 at the end of the lower pipe-like means, i.e. flow pipe 1, which basin is arranged to be closed, and onward through the connection means 3 to the upper pipe-like means, i.e. testing pipe 2. The testing pipe is preferably arranged to narrow in the direction of fluid flow, which prevents air bubbles generated by the control means from collecting on the walls of the pipe and allows them to flow to the lure tower and exit the device. The water flows at a rate defined by the control means through the testing pipe and exits through the connection means 4 at the other end of the pipe to the second stilling basin 10. By also making the stilling basin 10 closed, the efficiency of the device is improved, but a closed structure of the basin is, however, not necessary for the operation of the device. Next, the lure 12 to be tested is attached to a fishing line 14 and lowered from the lure tower 13 to the testing pipe where its swimming movement can be observed. In addition, an accelerating flow rate is achieved in the testing pipe which narrows toward its other end, whereby the lure being tested can immediately be tested in different flow conditions by moving it to different locations in the testing pipe.

Figure 2:
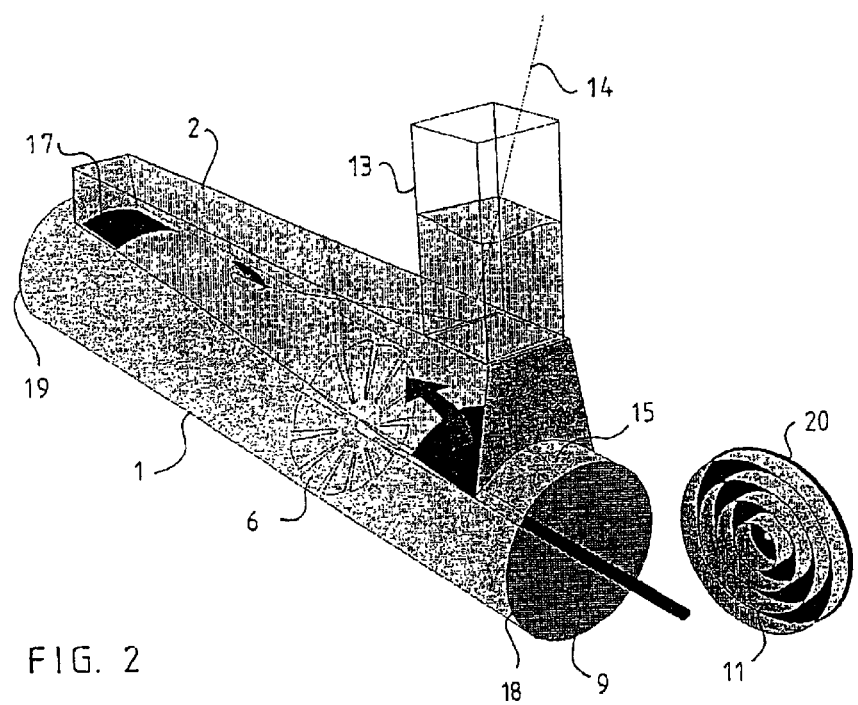
FIG. 2 shows a perspective view of a smaller swimming device of the invention, especially suited for testing flies.
Figure 3:
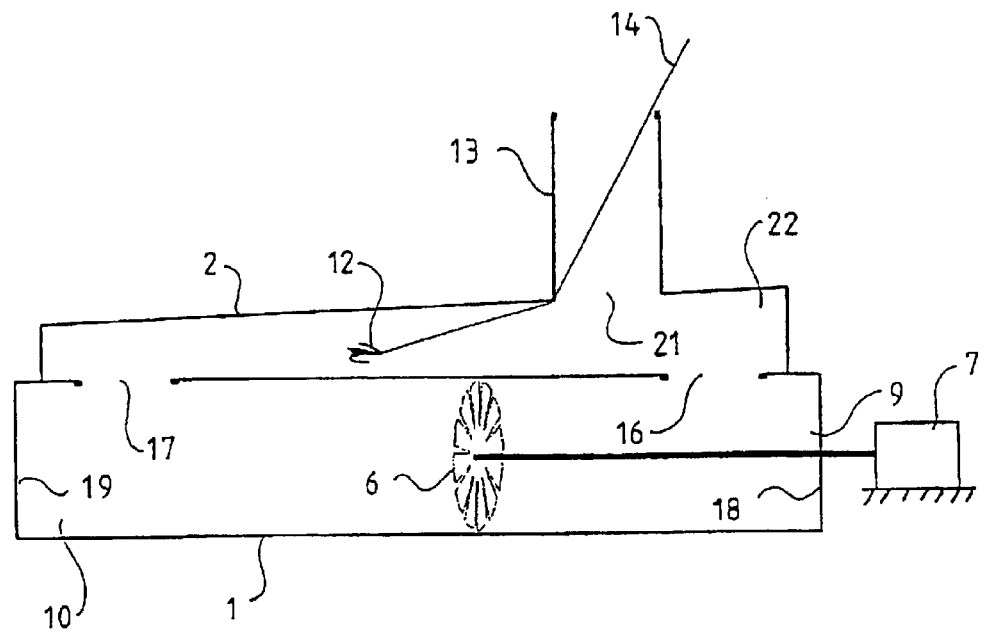
FIG. 3 shows the longitudinal profile of the swimming device of FIG. 2.

FIGS. 2 to 4 shows a swimming device intended especially for flies and small lures and mainly corresponding in structure to the device described above. This second embodiment of the invention is, however, more compact in structure, and the pipe-like means —flow pipe 1 and testing pipe 2—are connected to each other to reduce the size and simplify the structure. The propeller acting as the control means 6 is arranged in the flow pipe, and the testing pipe 2 which preferably narrows toward its other end is tightly arranged on the top surface 15 of the outer casing of the pipe. This testing pipe can be in shape a cut off pyramid, for instance, as in FIG. 2 or a cut off cone. The water being circulated in the device is led between the pipes through two flow ports 16 and 17 acting as connection means and located on the top surface of the casing of the flow pipe. These flow ports are arranged at a distance from the flow pipe ends 18 and 19, thus forming the stilling basins 9 and 10 at each end of the flow pipe. To reduce swirling in the water flow, concentric protrusions 11 according to FIG. 2 are preferably located in the end pieces 20 which close the ends of the flow pipe.

The lure tower 13 is preferably arranged on the top surface of the outer casing of the testing pipe 2 in such a manner that the discharge opening 21 between the lure tower and the testing pipe is, in the flow direction of water, arranged to be at least partly separate from the flow port 16 below in order to form a third stilling basin 22 at the end of the testing pipe. This prevents the flowing water from hitting the lure tower and achieves a steadier flow on the entire length of the device.

The second embodiment of the device according to the invention functions by filling it with water, for instance, as shown in FIG. 2. In this case, too, the filling is performed up to the reception means 13 to create a sufficient pressure to steady the water flow in the testing pipe 2. When the device is filled with water, the required water flow is achieved by the control means 6 by starting the motor 7, and forced by the control means, water flows to the stilling basin 9 at the end of the flow pipe 1. From the stilling basin, water flows through the flow port 16 to the testing pipe 2 and the third stilling basin 22 between the lure tower and the end of the testing pipe. Water flows on at the rate defined by the control means through the testing pipe arranged to narrow in the flow direction and discharges through the flow port 17 at the other end of the testing pipe to the second stilling basin 19 at the end of the flow pipe and on again to the control means. The lure 12 to be tested is attached to a line 14 and lowered from the lure tower 13 into the testing pipe where its swimming movement can be observed.

It is to be understood that the above description and the related figures are only intended to illustrate the present invention. The invention is thus not restricted to the above or to the embodiment specified in the claims, but it will be obvious to a person skilled in the art that many variations and modifications of the invention are possible within the scope of the inventive idea specified in the appended claims.

What is claimed is:

1. A swimming device for testing a fishing lure, comprising:
   a flow pipe;
   a testing pipe arranged substantially parallel to and vertically above said flow pipe, said flow pipe and said testing pipe being substantially closed to outside ambient;
   first and second connection members arranged at both ends of the flow and testing pipes and interconnecting said flow and testing pipes to permit fluid flow through said flow and testing pipes, said connection members each comprising a stilling basin;
   a control device maintaining the fluid flow in the swimming device; and
   a lure tower for lowering a lure into the swimming device through an opening in the lure tower, said lure tower extending substantially vertically from the testing pipe and connected thereto,
   wherein the flow pipe extends beyond the testing pipe and the connection members are flow ports in a wall of the flow pipe.

2. The swimming device as claimed in claim 1, wherein the lure tower has a discharge opening that is downstream of and adjacent to an upstream one of said flow ports in a direction of fluid flow.

3. The swimming device as claimed in claim 1, further comprising control lamellas in said flow pipe oriented in a longitudinal direction of said flow pipe.

4. The swimming device as claimed in claim 1, wherein at least said stilling basin downstream of said control member in a direction of fluid flow has protrusions.

5. The swimming device as claimed in claim 4, wherein the protrusions are concentric.

6. The swimming device as claimed in claim 1, wherein the control member is a propeller.

7. The swimming device as claimed in claim 1, wherein the control member is in the flow pipe.

8. The swimming device as claimed in claim 1, wherein the testing pipe is at least partly transparent.

9. A swimming device for testing a fishing lure, comprising:
   a flow pipe;
   a testing pipe arranged substantially parallel to and vertically above said flow pipe, said flow pipe and said testing pipe being substantially closed to outside ambient;
   first and second connection members arranged at both ends of the flow and testing pipes and interconnecting said flow and testing pipes to permit fluid flow through said flow and testing pipes, said connection members each comprising a stilling basin;
   a control device maintaining the fluid flow in the swimming device; and
   a lure tower for lowering a lure into the swimming device through an opening in the lure tower, said lure tower extending substantially vertically from the testing pipe and connected thereto,
   wherein the testing pipe decreases in diameter along a length of said testing pipe in a direction of fluid flow.

10. A swimming device for testing a fishing lure, comprising:
    a flow pipe;
    a testing pipe adjacent said flow pipe, said testing pipe decreasing in diameter along a length of said testing pipe in a direction of fluid flow;

first and second connection members interconnecting said flow and testing pipes to permit fluid flow through said flow and testing pipes;

a control device maintaining fluid flow in the swimming device; and a lure tower having an opening for lowering a lure into said swimming device, wherein said flow pipe is a hollow tube closed at both ends and said testing pipe is directly on top of said flow pipe, wherein said first and second connection members are flow ports in a wall of said flow pipe, and wherein said first and second connection members each comprise a stilling basin at said closed ends.

11. The swimming device as claimed in claim 10, wherein said control device is in said flow pipe.

12. The swimming device as claimed in claim 10, wherein at least one of said stilling basins has protrusions that reduce a swirling movement of the fluid flow.

13. The swimming device as claimed in claim 10, wherein each said stilling basin has a cross sectional area larger than said flow pipe.

14. The swimming device as claimed in claim 10, wherein said testing pipe is at least partly transparent.

* * * * *